United States Patent [19]

Christel, Jr.

[11] Patent Number: 4,613,815
[45] Date of Patent: Sep. 23, 1986

[54] ELECTROMAGNETIC DETECTOR FOR METALLIC MATERIALS HAVING AN IMPROVED PHASE DETECTION CIRCUIT

[75] Inventor: Conrad Christel, Jr., Dryden, N.Y.

[73] Assignee: Pall Corporation, Glen Cove, N.Y.

[21] Appl. No.: 489,175

[22] Filed: Apr. 27, 1983

[51] Int. Cl.$^4$ .................. G01N 27/72; G01R 33/12
[52] U.S. Cl. ..................................... 324/233; 324/243
[58] Field of Search ............... 324/233, 241, 242, 243, 324/326–329, 239

[56] References Cited

U.S. PATENT DOCUMENTS

| | | | |
|---|---|---|---|
| 2,858,505 | 10/1958 | Shawhan | 324/243 |
| 3,234,457 | 2/1966 | Sower et al. | 324/241 |
| 3,337,796 | 8/1967 | Hentschel et al. | 324/233 |
| 3,491,289 | 1/1970 | Petrini | 324/233 |
| 3,747,011 | 7/1973 | Buck | 324/236 |
| 3,872,380 | 3/1975 | Gardiner . | |
| 4,475,083 | 10/1984 | Linder | 324/233 |

FOREIGN PATENT DOCUMENTS

| | | |
|---|---|---|
| 0058076 | 8/1982 | European Pat. Off. . |
| 0096568 | 12/1983 | European Pat. Off. . |
| 501581 | 3/1939 | United Kingdom . |
| 637336 | 5/1950 | United Kingdom . |
| 845712 | 8/1960 | United Kingdom . |
| 875567 | 8/1961 | United Kingdom . |
| 943064 | 11/1963 | United Kingdom . |
| 1219480 | 1/1971 | United Kingdom . |
| 1534039 | 11/1978 | United Kingdom . |
| 2004374 | 3/1979 | United Kingdom . |

OTHER PUBLICATIONS

Heathkit Schematic and Circuit Description of Models GD-1190 and GD-1290.

Primary Examiner—Ernest F. Karlsen
Assistant Examiner—Walter E. Snow
Attorney, Agent, or Firm—Leydig, Voit & Mayer, Ltd.

[57] ABSTRACT

An electromagnetic detector device embodying a linear voltage differential transformer. A pair of coils of the differential transformer serve as pick-up coils connected in a detector circuit which is phase sensitive and capable of discriminating between signals representing a target metallic material, such as carbon steel particles trapped in a filter element, and signals induced by other metallic material, as well as stray signals including electrical noise. Input signals representing a target metallic material are fed to an operational amplifier circuit including a first non-inverting amplifier and a second inverting amplifier which produce a non-inverted signal and an inverted signal which are fed to an analog switch. The switch is operated as a chopper by a driver signal having a predetermined phase and the same frequency relative to the signal driving an input coil to the transformer. The phase of the driver signal is adjustable to provide phase discrimination. The coils of the transformer are wound on a core providing a sensor in which a filter element may be placed for test.

11 Claims, 7 Drawing Figures

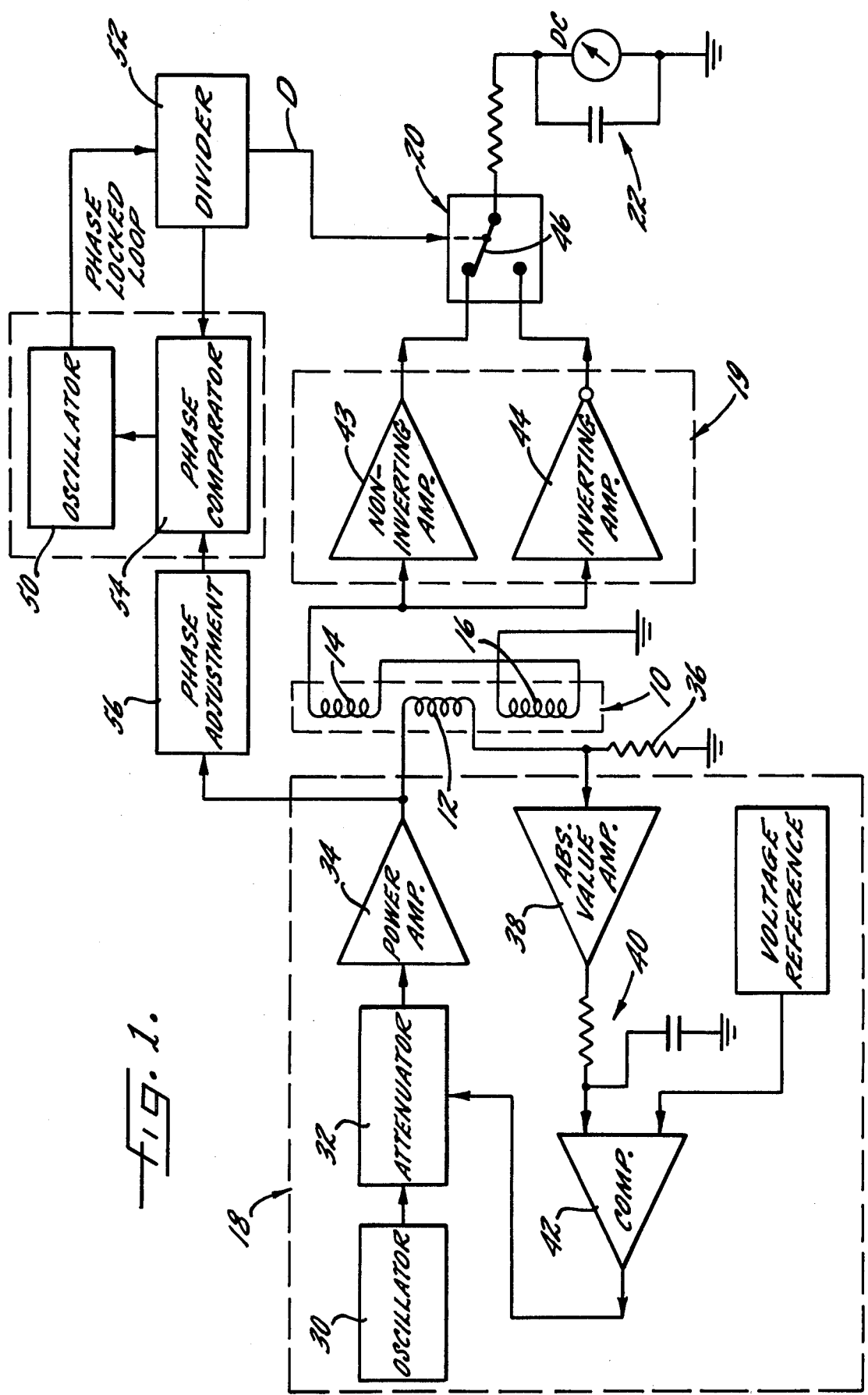

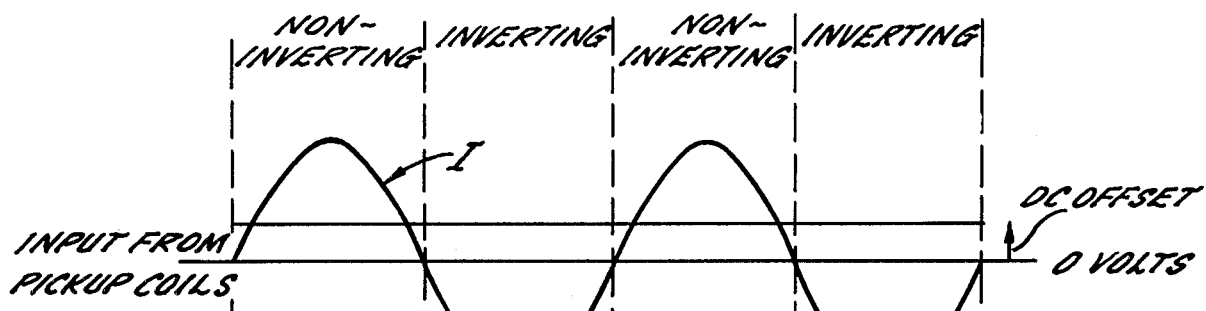
Fig. 2A.
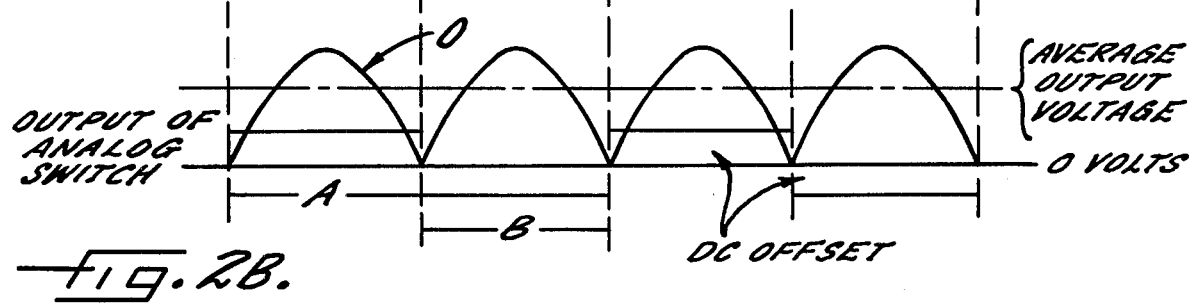
Fig. 2B.
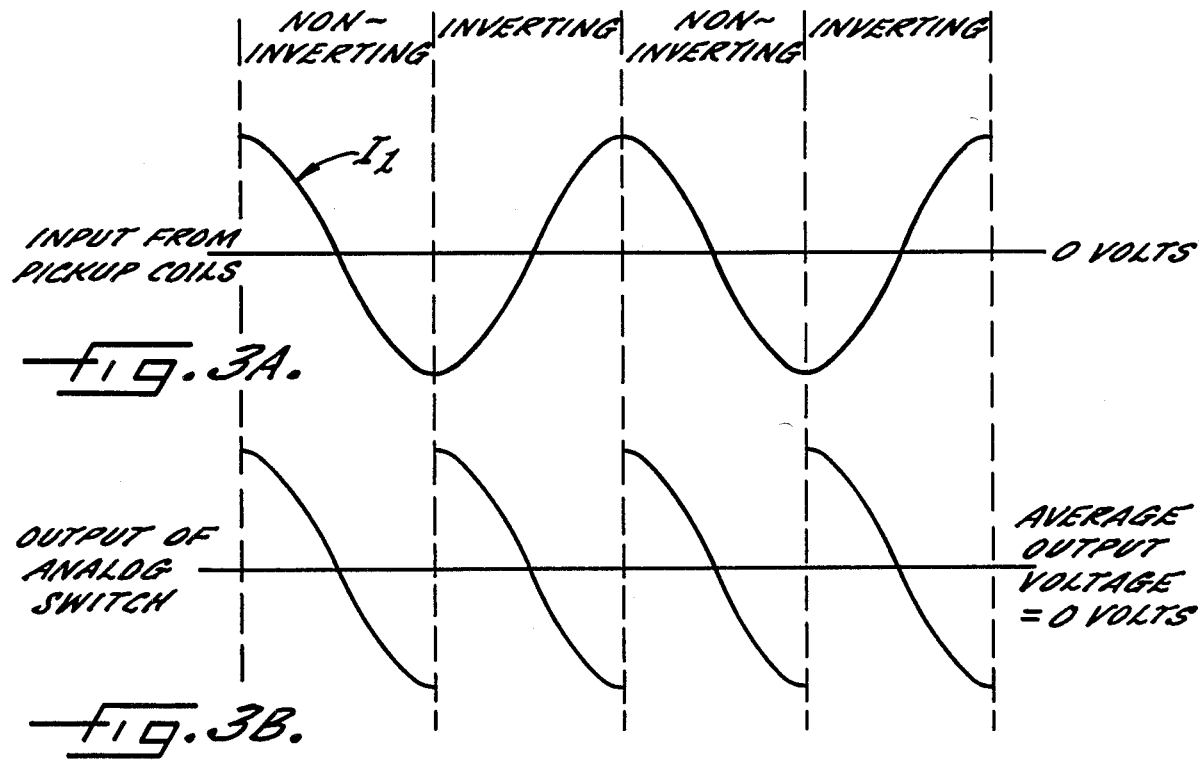
Fig. 3A.
Fig. 3B.

1

ELECTROMAGNETIC DETECTOR FOR METALLIC MATERIALS HAVING AN IMPROVED PHASE DETECTION CIRCUIT

TECHNICAL FIELD

This invention relates to electromagnetic detector devices and, more particularly, to devices of this type which are highly sensitive and capable of detecting small amounts of metallic material such as metallic debris in a filter element.

BACKGROUND ART

While the present invention has general application to electromagnetic detector devices for detecting or monitoring metallic material, it has particular utility in devices for detecting metallic debris trapped in the filter element of a filter cartridge to measure wear and predict failure of engines and machinery using filters in their lubricating or cooling systems.

Devices for detecting metallic materials incorporating a linear voltage differential transformer operate on the principal that a normally balanced alternating magnetic field linking opposed coils of the detector circuit will be distorted by metallic materials brought into the proximity of the coils; the distortion produces an imbalance in the signals induced in the opposed coils resulting in an input signal representing the presence of such materials. An alternating magnetic field linking coils of the detector circuit may also be distorted, however, by metallic materials in the proximity producing an imbalance in induced signals not indicative of a specific target material, and also may be distorted by stray magnetic fields which are present in industrial environments. Such distortions of the alternating magnetic field linking the coils of the detector unrelated to a target material or condition being monitored interfere with the proper functioning of the device as a detecting or measuring instrument.

DISCLOSURE OF THE INVENTION

The main object of this invention is to provide an electromagnetic detector device for sensing the presence of metallic material in a filter element.

Another important object is to provide an electromagnetic detector device of this type utilizing a linear voltage differential transformer and associated detector circuit.

A more specific object of this invention is to provide a detector circuit for an electromagnetic detector device of the type utilizing a linear voltage differential transformer which is capable of discriminating between induced signals representing a specific target metallic material to be sensed or monitored and induced signals resulting from distortions in the alternating magnetic field produced by various other conditions specifically including other metallic materials in the proximity of the device, such as metal members included in the structure of a filter element being tested for the presence of trapped metallic material.

Another object is to provide a detector circuit for an electromagnetic detector device which, in addition to being capable of discriminating between different metallic materials, also is capable of discriminating between induced signals representing a target metallic material and stray signals including electrical noise induced by stray magnetic fields linking the coils of the device and thus enabling the detector circuit to be highly sensitive and capable of indicating the presence of extremely small quantities of metallic material.

Another object is to provide a detector circuit for an electromagnetic detector device which is capable of phase sensitive detection of signals induced by distorted alternating magnetic fields in order to discriminate between different metallic materials, the operation of the circuit taking advantage of the phenomenon that metallic materials in the proximity produce not only magnetic field distortion but also distinctive phase shifts of the signals induced by the distorted alternating magnetic field linking the coils of the detector circuit.

Another object is to provide a detector circuit for an electromagnetic detector device which is phase sensitive for discriminating between signals of a given phase representing a target material and other out of phase signals which would otherwise affect the functioning of the circuit.

BRIEF DESCRIPTION OF THE DRAWINGS

Further objects will become apparent from the following description taken in connection with the accompanying drawings, in which:

FIG. 1 is a schematic block diagram of an electromagnetic detector embodying this invention;

FIG. 2A is a diagram of an input signal from the pick-up coils;

FIG. 2B is a diagram of an output signal derived from the input signal of FIG. 2A and composed of alternating non-inverted and inverted input signals chopped in phase with the input signal;

FIG. 3A is a diagram of an input signal from the pick-up coils 90 degrees out of phase with the input signal illustrated in FIG. 2A;

FIG. 3B is a diagram of an output signal derived from the input signal of FIG. 3A and composed of alternating non-inverted and inverted signals chopped in phase with the input signal illustrated in FIG. 2A;

BEST MODE FOR CARRYING OUT THE INVENTION

Figure 4:
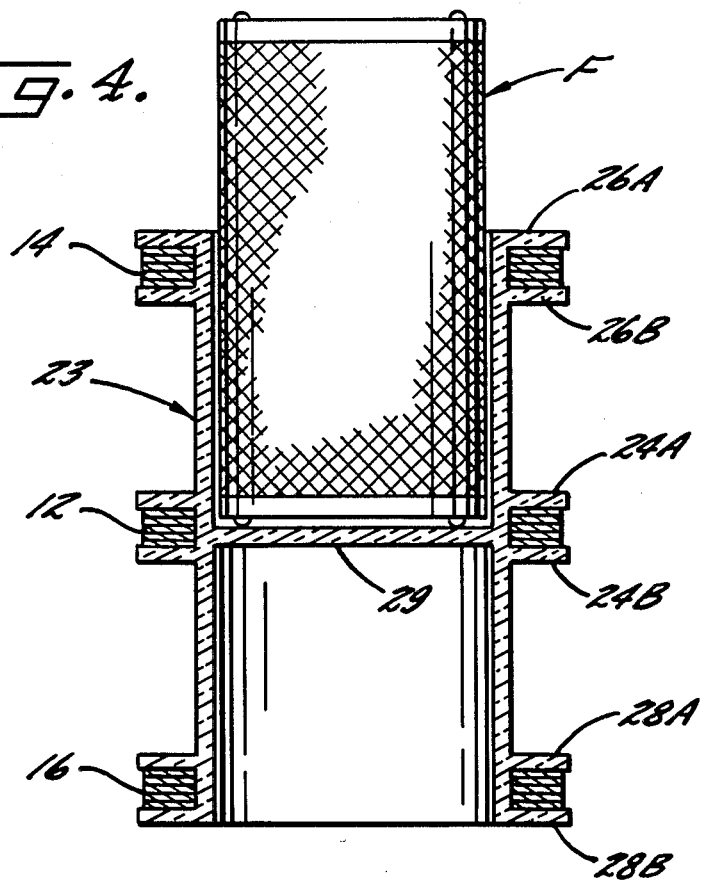
FIG. 4 is a sectional view taken in the plane of lines 4—4 in FIG. 5 illustrating a sensor according to this invention including windings of a differential transformer on a glass form.

Now turning to the drawings, an electromagnetic detector device is shown embodying a linear voltage differential transformer 10 shown in FIG. 1 as having three windings including a center input coil 12 and a pair of outside pick-up coils 14, 16. The center input coil 12 receives a sinusoidal alternating current from an AC signal source 18 and generates a normally balanced alternating magnetic field linking the pair of outside pick-up coils 14, 16. The coils 14, 16 are either counter-wound or counter-connected to serve as pick-up coils that combine in opposed relation signals induced in the coils, the signals cancelling each other out when the system is in balance. The magnetic field linking these pick-up coils 14, 16 will be distorted by metallic materials brought into their proximity, the distortion producing an imbalance in the signals induced in the coils. This imbalance in induced signals provides an input signal representing the presence of such materials. Such input signal is processed by operational amplifier means 19 and switch means 20 and supplied as a DC output signal to a DC output signal sensing means 22 for indicating the presence of such metallic material in the proximity of the pick-up coils 14, 16.

Figure 5:
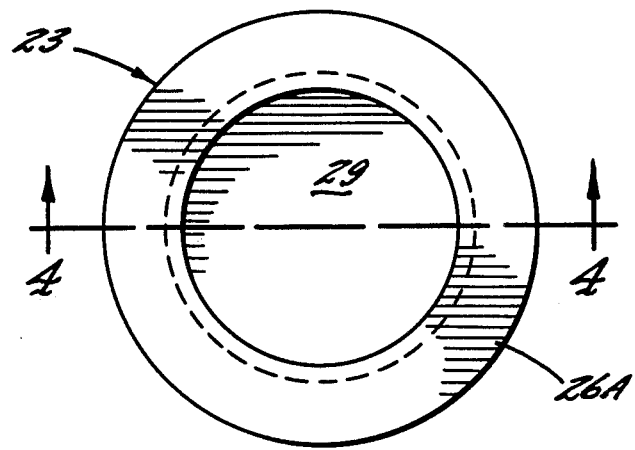
FIG. 5 is an end view of the sensor of FIG. 4.

In carrying out this invention, to provide an electromagnetic detector device having particular, but not exclusive, utility as a detector for metallic debris trapped in a filter element, the input coil 12 and pick-up coils 14, 16 of the differential transformer 10, as shown in FIGS. 4 and 5, are wound on the periphery of a cylindrical form 23 having an open core into which a filter element F may be placed for tests (FIG. 4) after removal from its housing. The coils of the differential transformer wound on the form 23 provide a sensor for detecting metallic debris trapped in the filter element, enabling the measurement of wear and a means for predicting failure of engines and machinery using such filter elements in their lubricating or cooling systems.

To achieve a detector device of high sensitivity, the cylindrical form 23 is preferably of a material having a low coefficient of thermal expansion, for example, glass. While other materials may be used for the form, it is preferred to use materials which have dimensional stability such that when a filter element containing hot lubricating oil, for example, is placed in the sensor, the heat transmitted to the form will have minimum effect on the signal from the pick-up coils due to changes in dimensions of the form resulting from variations in its temperature.

The center input coil 12 of the transformer 10 is wound between axially spaced peripheral flanges 24A, 24B symmetrically located adjacent the center of the form 23 and similar axially spaced peripheral flanges 26A, 26B, 28A, 28B at the opposite ends of the form 23 are provided for the respective pick-up coils 14, 16 of the transformer. The cylindrical form 23 has a core open at the upper end so that a filter element (F, FIG. 4) to be tested can be inserted in that end; the cylindrical form 23 has an intermediate wall 29, the upper surface of which is at the dead center axially of the core. The intermediate wall 29 locates a filter element F inserted from the upper end in an off-center position within the form 23 such that any metallic material in the filter element will be located in closer proximity to the outside upper pick-up coil 14 than to the lower pick-up coil 16, causing a distortion in the magnetic field linking the pick-up coils, an imbalance in the signals induced in the coils and, thus, an input signal representing the metallic material in the filter element.

It has been found that the phase of the voltage signal induced in the pick-up coils 14, 16, relative to the phase of the voltage signal of the source 18, depends on the type of metal introduced within the field of the detector device. Many non-magnetic alloys such as aluminum and some stainless steels cause a voltage signal to be induced which is approximately 90 degrees out of phase with the signal produced by carbon steel.

In carrying out the invention, a detector circuit is provided including the pick-up coils 14, 16 which is phase sensitive and capable of discriminating between signals representing a target metallic material, such as carbon steel particles trapped in a filter element, and signals induced by other metallic materials as well as stray signals including electrical noise induced by stray magnetic fields linking the pick-up coils. Thus, based on the phase of the signals, the phase discriminating capability of the detector circuit is used to distinguish between metallic debris trapped in a filter element and metal structural components used in filter elements, such as stainless steel end caps, cores or support mesh for the filter medium.

Referring to FIG. 1, the signal source 18 includes a 1 kHz sine wave generator 30 which is fed through an attenuating circuit 32 to the input of an audio frequency power amplifier 34. The output of the power amplifier 34 drives the center input coil 12 of the differential transformer 10. It is desired that the center input coil 12 and amplifier 34 be reasonably impedance matched. For example, in a preferred construction the input coil has a 4 ohm impedance at 1 kHz to take advantage of readily available audio power amplifier modules. The input coil 12 is connected to ground through a 0.1 ohm precision resistor 36. Current through the coil is then proportional to the voltage across the resistor 36. This voltage is applied to the input of an absolute value amplifier 38 which converts it to a pulsating DC signal with an average magnitude proportional to the winding current. After RC ripple filtration in the filter 40, this average voltage is compared to a fixed reference voltage in the comparator 42 which controls the attenuating circuit 32 at the end of the feedback loop to vary the magnitude of the sine wave input to the audio amplifier 34. This feedback loop automatically maintains a constant alternating current level in the input coil 12, illustratively a 1 ampere RMS signal. Because the strength of the magnetic field produced by the coil 12 is proportional to the number of ampere turns, current regulation rather than voltage regulation of this signal is desired. This circuit provides automatic compensation for any thermal or other environmental variations in the inductance or resistance of the coil 12 or its cables and connectors.

Now turning to the detector circuit, the combined output of the two opposed pick-up coils 14, 16 is fed to the operational amplifier means 19, herein shown as including a first non-inverting amplifier 43 and a second inverting amplifier 44. These amplifiers 43, 44 produce a non-inverted signal and an inverted signal which are fed to the inputs of an analog switch 46. The switch 46 is operated as a chopper by a driver signal D having a predetermined phase and the same frequency relative to the signal from the source 18. The phase of the driver signal D is adjustable for selecting a component of the input signal from the pick-up coils 14, 16 having a particular phase determined by target metallic material in proximity to the pick-up coils 14, 16. The component of the input signal from the pick-up coils 14, 16 that is in phase with the driver signal D will be supplied to the output signal sensing means 22 while the out of phase components and any DC offset will be self-cancelling by the operation of the switching means.

To illustrate, referring to FIG. 2A, an input signal I from the pick-up coils 14, 16 is shown that is in phase with a driver signal D derived from the signal source 18. The output signal O of the analog switching means 20 is shown in FIG. 2B which indicates that the switch 20 acts as a chopper on the input signal I and transmits to the sensing means 22 the positive half of the input signal during a first interval A with the switch 20 in one state and the inverted negative half of the input signal during a second interval B with the switch 20 in its second state. Thus, the switch 20 samples the output of both operational amplifiers 43, 44 for equal intervals of time according to the relative phase of the driver signal.

Referring now to FIG. 3A, an input signal $I_1$ is shown which is 90 degrees out of phase with a driver signal D derived from the signal from the source 18. This approximates a signal induced by aluminum or stainless steel in the proximity of the pick-up coils, for example. FIG. 3B illustrates that the switch 20 acts as a chopper and transmits to the sensing means 22 the chopped, non-inverted and inverted signals. In this case, the negative portions of the input wave are equal in magnitude to the positive portions of the wave and the signals are self-cancelling as sensed by the DC output signal sensing means 22.

As indicated in FIG. 2B, when the analog switch 20 samples the output of both amplifiers 43, 44 for equal intervals of time, any incoming DC offset will be self-cancelling by virtue of the opposing amplifier polarities. Low frequency interference signals will be similarly ignored. High frequency signals will be self-cancelling by the nature of the DC voltage measurement by the sensihg means 22. Thus, the only signal that will register at the output is one that is at the frequency and phase determined by the driver signal D operating the analog switch 20.

To achieve a high level of DC rejection, the time intervals that the analog switch 20 samples the output of both amplifiers 43, 44 must be very nearly equal. To achieve this, in keeping with the invention digital circuitry is employed in deriving the driver signal D. As shown in FIG. 1, the voltage controlled oscillator 50 of a phase locked loop is set to oscillate at a frequency such as 2 kHz. This signal is fed to a binary divider 52 resulting in a 1 kHz square wave output. Each time a negative transition of the incoming 2 kHz signal is detected, the output of the binary divider 52 changes state from high output voltage to low output voltage or vice-versa. Thus a full cycle of output of the divider 52 requires two cycles of input. Because the divider 52 uses the same negative transition, detected by the same input circuitry for each reversal, the duty cycle of its output is assured to be very close to 50 percent. Due to harmonic distortion, DC offset, differences between positive and negative triggering circuits and other variables, it is difficult to detect polarity reversals directly from a sine wave and expect the measured positive intervals to equal the negative intervals. The frequency dividing system shown herein takes advantage of the great repeatability of oscillators from one cycle to the next without regard to the fact that each cycle could be symmetrically distorted.

The output of the binary divider 52 is fed to one input of a phase comparator 54. The other input comes from the output of the audio frequency power amplifier 34 of the signal source 18 through a phase adjusting circuit 56. The output of the phase comparator 54 regulates the voltage controlled oscillator 50 assuring that the output of the binary divider 52 is in the desired phase with the signal from the power amplifier 34. The phase adjusting circuit may be an RC network with which the analog switching periods can be phase shifted to maximize any desired phase of signal from the pick-up coils.

Accordingly, the precisely proportioned square wave output of the binary divider 52 is the driver signal for the analog switch 20, which provides an even duty cycle, in synchronization with an adjustable phase angle to the amplified oscillator signal from the signal source 18.

The nature of the phase sensitive detection circuitry is such that signals at the operating frequency and in the selected phase are transmitted without attenuation much like a full wave rectified signal (see FIG. 2B). As the phase angle of the incoming signal goes from 0 degrees to 90 degrees, the filtered or averaged output goes to zero following the curve of the cosine of the phase angle (see FIG. 3B). At 180 degrees, the output will be the negative of an in phase signal and, at 270 degrees, it will again cancel out to zero. As the phase angle approaches 360 degrees, the signal will be coming back into phase, giving an unattenuated average output, still following the cosine curve of the phase angle. In this manner, signals of different phases can be selectively tuned in or out. One signal, however, can be tuned completely in, to the total exclusion of another, only if the two are exactly 90 degrees apart.

It will be seen that the phase of detection may be selected not so much as to maximize the signal of the desired carbon steel debris as to null out the signal of stainless steel components of the filter element. These signals are very nearly 90 degrees to each other so that when the stainless steel elements are nulled, the carbon steel debris signal is nearly at its peak strength.

In some applications it might be desirable to place a clean dummy filter symmetrically located with respect to the filter under test in the bottom of the sensor to balance this out of phase field distortion, thus minimizing zero offset.

For a specific, practical unit, a frequency of 1 kHz was selected. Detection of non-magnetic metals is much more pronounced at higher frequencies while magnetic materials are not as frequency sensitive. For this reason, a much lower frequency would be chosen (as low as a few Hz) if only magnetic materials were to be detected. Where non-magnetic metal debris is of interest, frequencies as high as 100 kHz may be used. Such a detector would be particularly useful with filter elements made completely of plastic components.

In the disclosed preferred embodiment of this invention, the filter element F is removed from its housing in the lubrication system of an engine and placed in the sensor carrying the pick-up coils 14, 16. However, it is contemplated that the invention has application for testing for metallic material in a filter element without having to remove it from its housing and to other in situ detecting or sensing applications. It has particular utility for such other applications because of the phase discriminating capability of the detector circuits disclosed herein where it may be used to distinguish between metallic debris trapped in a filter element and metal structural components in the surrounding environment. Other applications as well as other features and advantages of the invention will become apparent to one skilled in the art, the scope of the invention being determined by the accompanying claims.

I claim:

1. An electromagnetic detector for sensing metallic material in a filter element comprising, in combination:
   a cylindrical form having means defining a test position and adapted to receive a filter element in said position for test;
   a differential transformer having an input coil and a pair of pick-up coils wound on said cylindrical form, one of said pick-up coils being located adjacent a filter element in said position for test;
   a signal source of signals of selected frequency applied to said input coil having a feedback loop to maintain a constant alternating current level in said input coil for generating a balanced alternating magnetic field linking said pair of pick-up coils; and
   a detector circuit connected to receive combined and opposed signals induced in said pick-up coils by said alternating magnetic field, said combined signals being effectively opposed and cancelled when metallic material is not present in a filter element in said cylindrical form for test and the magnetic field is balanced, and being imbalanced when metallic material is present in a filter element in said cylindrical form for test and the magnetic field is imbalanced, the imbalanced signals producing metallic-representing input signals from said pick-up coils with a particular phase relative to said source signals, and said detector circuit including phase sensitive determining means for discriminating between input signals of a particular phase representing metallic material in the filter element under test and other input signals having a different phase and representing other metallic materials in proximity to said pick-up coils, said phase sensitive determining means including:
(a) operational amplifier means connected to receive the input signals and operable to produce non-inverted signals and inverted signals;
(b) means including a connection to said signal source for producing driver signals having the same frequency as and a selected phase relative to the input signals;
(c) output signal sensing means; and
(d) switch means connected to receive the driver signals and operable in combination with said operational amplifier means to transmit to said outut signal sensing means the non-inverted signals and the inverted signals during alternate time intervals determined by the frequency and phase of the drive signals, and thereby provide output signals determined by the input signals representing the metallic material in the filter element under test.

2. The combination according to claim 1 in which said means for producing driver signals includes means for adjusting the phase of the driver signals with respect to the phase of said source signals for matching the phase of said driver signals to the phase of said input signals representing metallic material in the filter element under test in proximity to said pick-up coils.

3. The combination according to claim 1 in which said phase sensitive determining means includes means for chopping said input signals during alternate time intervals synchronized with the phase and frequency of said input signals for cancelling other input signals of a different phase representing other metallic materials in proximity to said pick-up coils, electrical noise, and DC offset.

4. The combination according to claim 1 in which said phase sensitive determining means is adjustable.

5. An electromagnetic detector according to claim 1 in which said cylindrical form is provided with a pair of symmetrical cavities for receiving a filter element for test and a dummy clean filter to balance out of phase field distortion, thus minimizing zero offset.

6. In combination,
(1) a coreless differential transformer having an input coil and a pair of pick-up coils, a source providing a signal of selected frequency applied to said input coil for generating an alternating magnetic field linking said pair of pick-up coils; and
(2) a detector circuit connected to receive and combine in opposed relation signals induced in said pick-up coils by said alternating magnetic field, metallic material in the proximity thereof causing a distortion in said magnetic field and an imbalance in said signals induced in said pick-up coils, resulting in an input signal from said pick-up coils, said circuit including:
(a) operational amplifier means connected to receive said input signal and operable to produce a non-inverted signal and an inverted signal;
(b) means including a connection to said source for producing a driver signal having a predetermined phase and the same frequency relative to said source signal;
(c) output signal sensing means; and
(d) switch means connected to receive said driver signal and operable in combination with said operational amplifier means to supply to said output signal sensing means said non-inverted signal and said inverted signal for alternate time intervals determined by the phase and frequency of said driver signal and thereby provide an output signal determined by the input signal and the phase and frequency of said driver signal.

7. The combination according to claim 6 in which said means for producing a driver signal includes means for adjusting the phase of said driver signal with respect to the phase of said source signal for selecting an input signal having a particular phase and frequency and representing a target metallic material in proximity to said pick-up coils for transfer to said output signal sensing means.

8. The combination according to claim 6 in which said means for producing a driver signal comprises a digital circuit including an oscillator for generating a signal at a frequency which is a multiple of the frequency of said source signal, a divider for producing a driver signal in the form of a square wave having the same frequency as said source signal and an even duty cycle, and a phase comparator for synchronizing said square wave driver signal in a selected phase relationship relative to said source signal.

9. In combination,
(1) a source providing a signal of selected frequency;
(2) means associated with said signal source for producing an input signal having a target component with the same frequency and a particular phase relative to said signal source; and
(3) a detector circuit connected to receive said input signal, said circuit including:
(a) operational amplifier means connected to receive said input signal and operable to produce a non-inverted signal and an inverted signal;
(b) means including a connection to said source for producing a driver signal having the same phase and frequency as said input signal;
(c) output signal sensing means; and
(d) switch means connected to receive said driver signal and operable in combination with said operational amplifier means to transmit to said output signal sensing means said non-inverted signal and said inverted signal for alternate time intervals determined by the phase and frequency of said driver signal, thereby cancelling other components except said target component from said output signal.

10. The combination according to claim 9 in which said means for producing a driver signal includes means for adjusting the phase of said driver signal with respect to the phase of said source signal for selecting a target input signal.

11. The combination according to claim 9 in which said means for producing a driver signal comprises a digital circuit including an oscillator for generating a signal at a frequency which is a multiple of the frequency of said source signal, a divider for producing a driver signal in the form of a square wave having the same frequency as said source signal and an even duty cycle, and a phase comparator for synchronizing said square wave driver signal in a selected phase relationship relative to said source signal.

* * * * *